Patented Apr. 28, 1925.

1,535,214

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS OF PRODUCING LAMPBLACK.

No Drawing. Application filed June 27, 1921. Serial No. 480,838.

*To all whom it may concern:*

Be it known that I, GUSTAV EGLOFF, a citizen of the United States, residing in the city of Chicago, county of Cook, and State of Illinois, have invented certain new and useful Improvements in Processes of Producing Lampblack, of which the following is a specification.

This invention relates to improvements in process of producing lamp black and refers more particularly to the treatment of residual oil whereby lamp black may be produced therefrom.

Among the salient objects of the invention are to provide a process in which the residual oil from stills such as pressure stills used for the production of gasoline or the like is treated in a separate process to produce lamp black, carbon black or similar colloidal carbon formations; to provide a process in which carbon containing oils at a high temperature are permitted to be partially consumed by an insufficient amount of air whereby the oil produces a formation of colloidal carbon in the form of lamp black which is removed from the apparatus by scraping from the interior thereof; to provide a process which may be carried out under pressure or under atmospheric conditions and in general to provide a process of the character referred to.

Oils such as Mexican oils or other low gravity hydrocarbon oils after treatment for their lighter products contain a considerable quantity of carbon. Such oils as are recovered as residuum from stills are rich in this carbon content and are adaptable for the production of lamp black or carbon black as hereinafter explained. This invention concerns the converting of this residuum oil into lamp black or carbon black by burning the hot residual oil as it leaves the distallation system where it is directed while at a high temperature to separate apparatuses where in the presence of an insufficient amount of oxygen or air, the residual product is burned and the burning so limited by the air supply to the apparatus that the oil is consumed only to the lamp black stage and not continuing to the carbonic oxide condition. That is, it is a smudge fire effect which may be carried out under pressure or under substantially atmospheric conditions of pressure. The amount of air which is permitted to enter the combustion chamber in the formation of the lamp black must be limited and accurately controlled so as to prevent explosion and not to carry the reaction on to the production of carbon monoxide or carbon dioxide.

The stages of the process are as follows: The residuum leaving the stills after being relieved of its lighter constituents passes to another still which may or may not be maintained under pressure. The air, in an insufficient amount, is passed into the secondary still with the residuum and burns the residual oil forming lamp black and water. The water passes off as steam and the carbon or lamp black is cooled and scraped off from the cooler part of the secondary still and is thence passed to a hopper where it is collected to be shipped. If it is desired to maintain a pressure on the secondary apparatus where the carbon black is formed, the uncondensable gases or vapors of the system such as steam and some light hydrocarbons which may be generated as a by-product of the burning may be confined within the secondary apparatus. The residuum oil burned in the secondary still should be consumed as a yellow flame for this burning generates the maximum amount of lamp black.

The lamp black or carbon black thus produced is adapted for use in loading rubbers, inks and numerous other types of pigmentation.

A feature of the invention lies in the fact that the residual oil which is recovered from oil distillation processes is at a high enough temperature to be directly introduced into reacting zones to produce lamp black. It is only necessary that the oil be at a temperature above its flash point and that the air be introduced in accurately controlled quantities. By treating the residual oil at a high temperature, the necessity of heating the oil is obviated and further economy is effected by the fact that a greater part of this residual oil is not retreated and is merely waste when the by-products are not extracted therefrom.

I claim as my invention:

1. The process of manufacturing lamp black, comprising discharging residual oil from a still into a second treating still, and there injecting into said oil, while at a temperature above it flash point, air in sufficient quantities to cause a partial combustion thereof, but limiting the introduction of air so as to permit the reaction to be carried on only to the stage where lamp black is produced.

2. The process of producing lamp black from residual oil resulting from the distillation of petroleum, consisting in introducing to said residual oil while in a still and at a temperature above its flash point a quantity of air, in limiting the amount of air admitted so that the residuum is consumed only to the lamp black stage without continuing the reaction until a carbonic oxide condition is reached.

3. A process of manufacturing lamp black from residual oil, consisting in discharging the residual oil from a still while in a highly heated condition to a second treating still and there injecting into said oil while it is at a temperature above its flash point air in sufficient quantities to cause a partial combustion thereof, and in limiting the introduction of air so as to permit the reaction to be carried on only to the stage where lamp black is produced.

GUSTAV EGLOFF.